Jan. 28, 1958  F. W. HOOPER  2,821,285
CONVEYOR SYSTEM FOR PULP DRYERS
Filed April 9, 1956  5 Sheets-Sheet 1
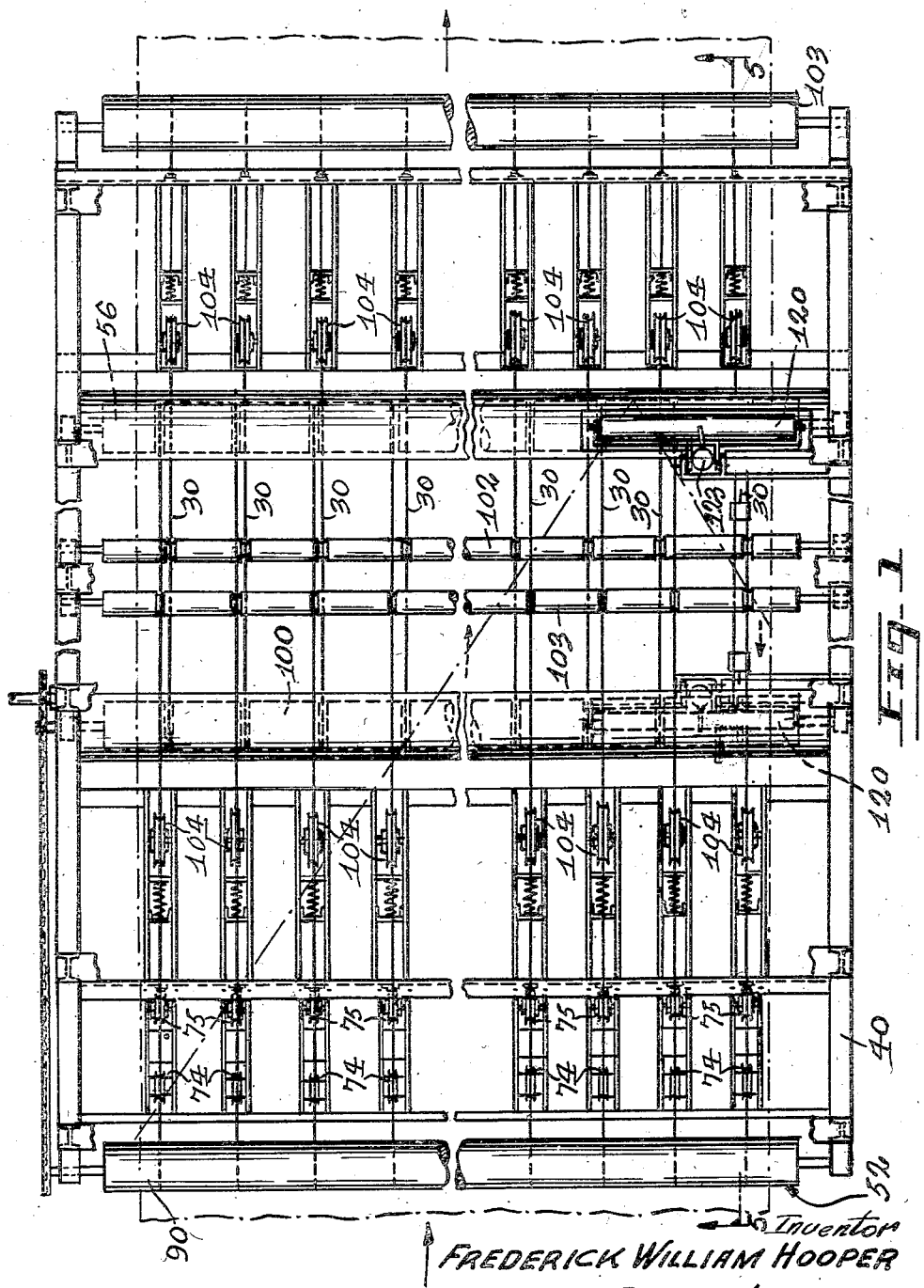
Inventor
FREDERICK WILLIAM HOOPER
By Alan Swabey
Attorney Jan. 28, 1958     F. W. HOOPER     2,821,285
CONVEYOR SYSTEM FOR PULP DRYERS Filed April 9, 1956     5 Sheets-Sheet 2

Inventor
FREDERICK WILLIAM HOOPER
By Alan Swabey
Attorney

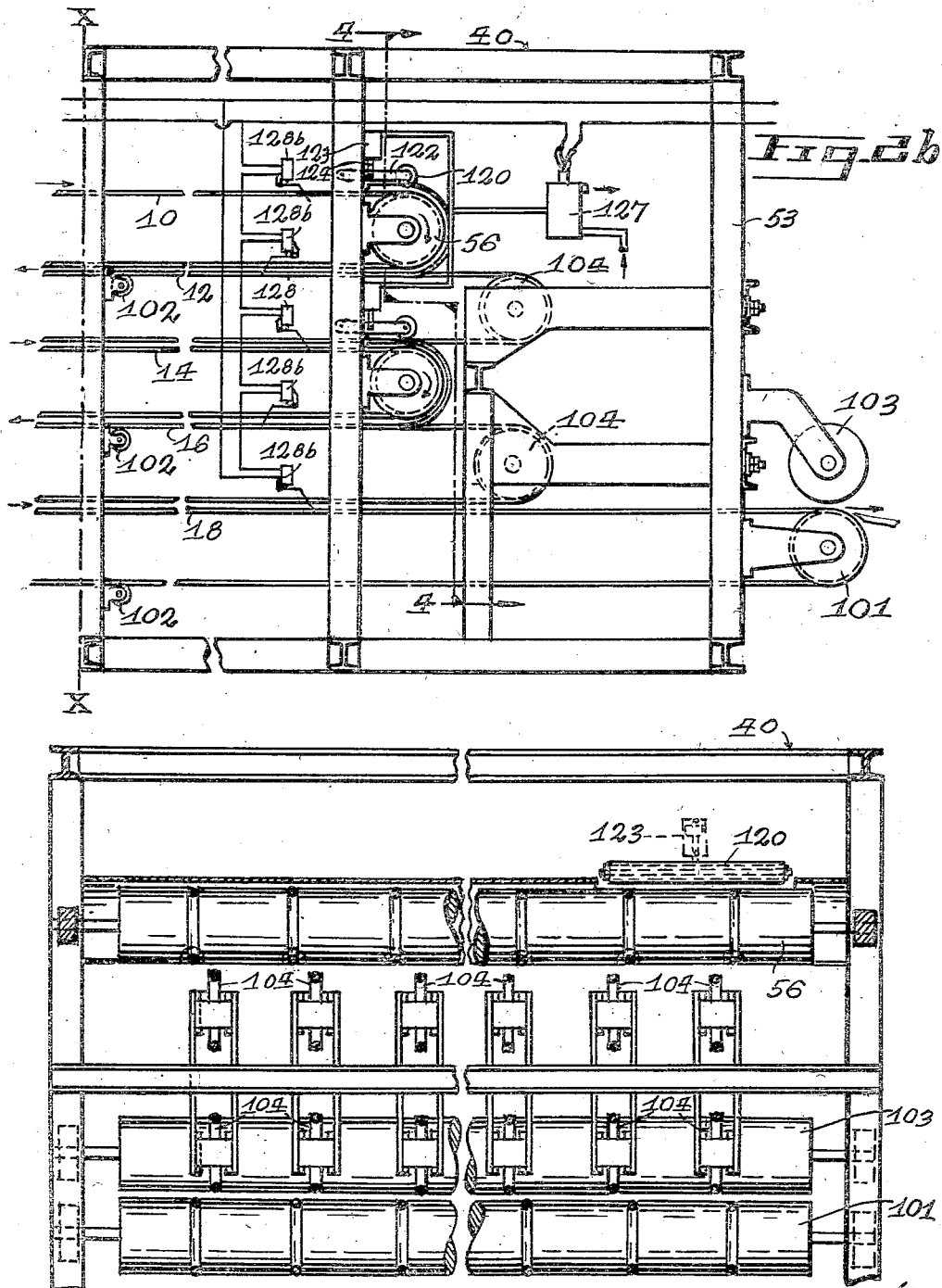

Jan. 28, 1958  F. W. HOOPER  2,821,285
CONVEYOR SYSTEM FOR PULP DRYERS
Filed April 9, 1956  5 Sheets-Sheet 4
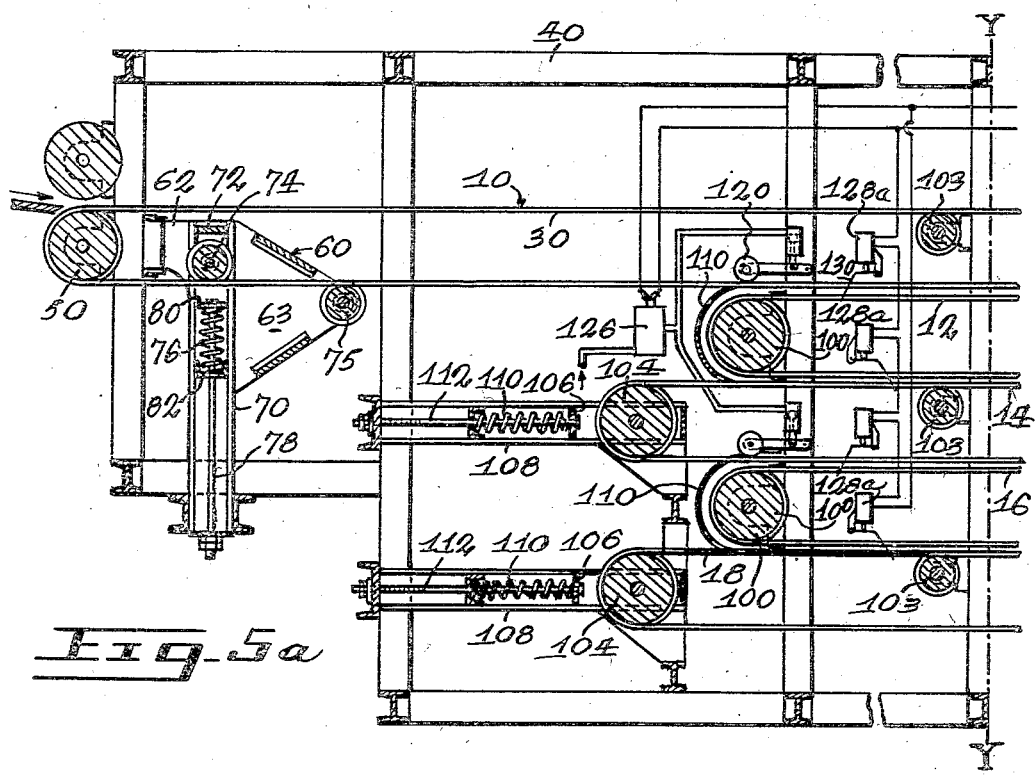
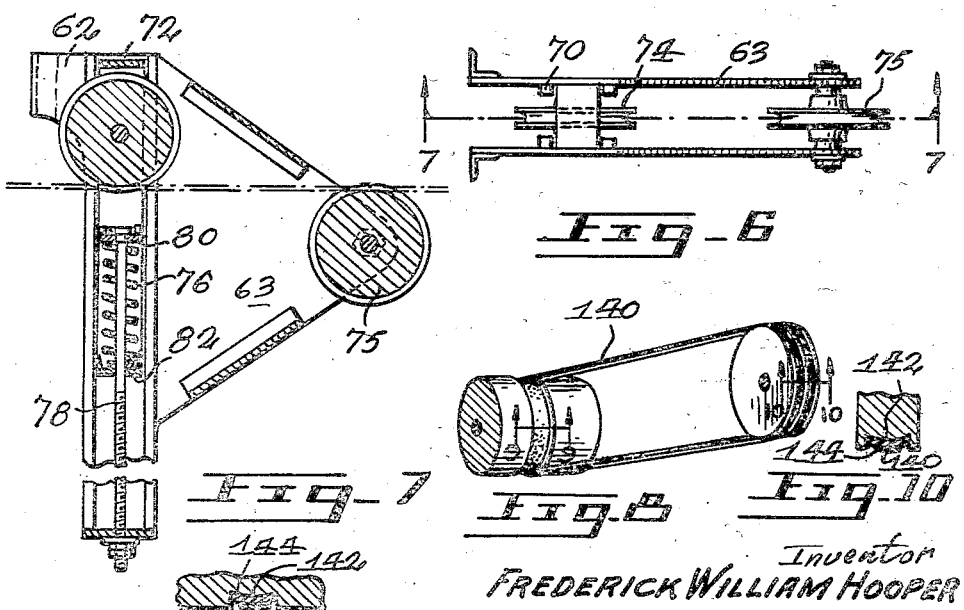
Inventor
FREDERICK WILLIAM HOOPER
By Alan Swabey
Attorney

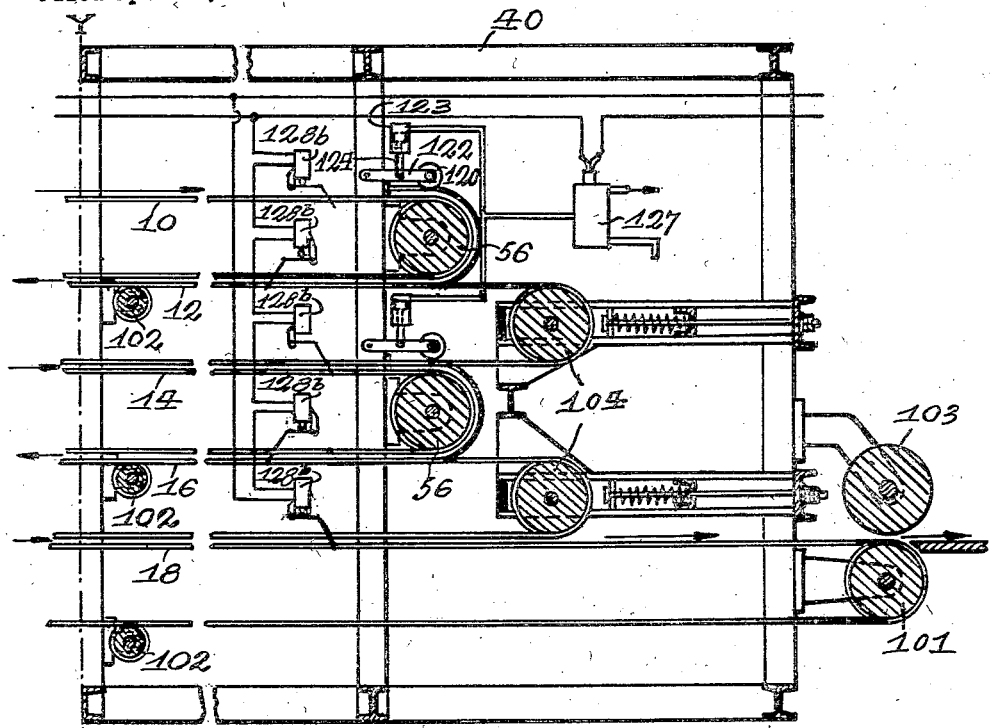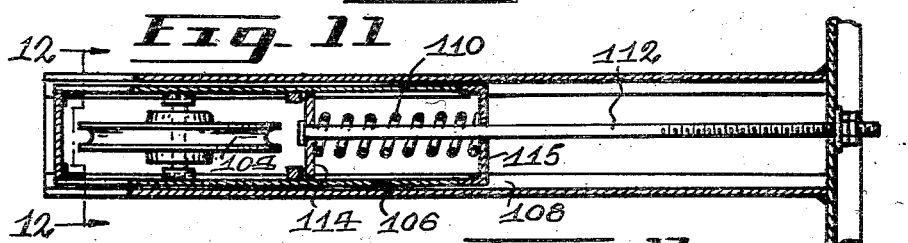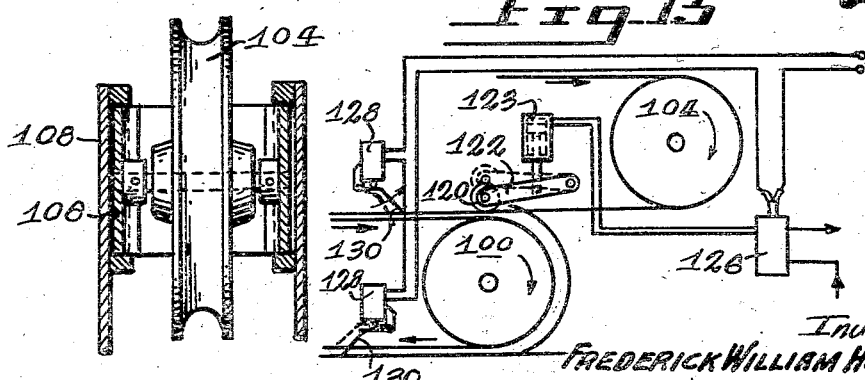

United States Patent Office 2,821,285
Patented Jan. 28, 1958

2,821,285

CONVEYOR SYSTEM FOR PULP DRYERS

Frederick William Hooper, Montreal, Quebec, Canada, assignor to Ross Engineering of Canada Limited, Montreal, Quebec, Canada Application April 9, 1956, Serial No. 576,877

12 Claims. (Cl. 198—84)

The present invention relates to the manufacture of dryers for paper pulp.

To briefly review the type of apparatus with which the present invention is concerned the known apparatus used for this purpose is generally in the form of a large permanent structure anywhere up to 100 feet in length, perhaps twenty (20) feet wide, and anywhere up to 25 or 30 feet high. Inside of this structure there are a plurality of courses or flights of conveyor chains, between which there are mounted rods or bars in spaced apart relationship which extend across the width of the machine.

The courses of the conveyor take alternate paths and the pulp is fed into the machine in the form of a relatively thick sheet of wet material (in the order of anywhere from ¼" to ½" thick) with the leading end being manually engaged with one of the transverse rods of the conveyor so that it is drawn along the length of the apparatus to one end where it is manually transferred to the next flight and returned to the other end, where it is again manually transferred to the succeeding flight, and so on.

In order that the operator can reach the top course, and in fact all the higher courses, these known structures are usually provided with an elevator at each end to carry the men up and down for this loading through process. Once the top sheet has been completely threaded through the apparatus it continues until the run is completed. It should also be mentioned that in order to give the desired drying action to the pulp sheet as it is being conveyed, there are a plurality of steam pipes interposed between each course so that the entire inner area of the apparatus is subject to constant high temperatures. This means that the operators carrying out the manual transfer of the pulp sheet from course to course are working under extreme difficulties.

Further, since the transverse rods between the conveyor chains must be sufficiently strong to support the weight of the pulp sheet and the conveyor chains must be strong enough to support the weight of the rods and the pulp sheet, the amount of power required to drive a unit of this nature is quite high. Still further, due to the complicated bulky arrangement of the known apparatus outlined above, the maximum speed at which the machine can be run is in the order of 125 feet per minute. Since the succeeding pulp sheet treating apparatus is dependent on the speed at which the wet pulp sheet can be taken through the dryer, this means that all of the associated machinery is limited to the speed at which the dryer can be operated.

There are other disadvantages in the known pulp dryer arrangements described above. For example, if for any reason a break occurs in a conveyor chain or a transverse supporting rod, the usual result is for one or two of the courses to be completely wrecked or jammed together. This of course, is also liable to damage the internal steam pipes and in general ties up the whole dryer for a considerable length of time until the necessary repairs are made.

Recently, steps have been taken to eliminate the steam pipe arrangement by the introduction of equipment for introducing hot air under pressure to dry the pulp sheet but as far as is known to the applicant, no steps have been taken with respect to improvements in the conveyors moving the sheet through the drying area.

The present development is concerned primarily with the provision of an improved means of conveying the pulp sheet through the dryer apparatus. With the present arrangement, the need for manually transferring the sheet from one course to another is eliminated. The complicated and heavy arrangement of chains and rods is done away with. Upon experiment, it has been found that a conveyor apparatus for a dryer in accordance with the present invention can be run at speeds greatly exceeding those possible with the known apparatus of this type described above.

More specifically, the present invention comprises a pulp sheet conveying arrangement adapted for use in combination with a drying enclosure and which utilizes a plurality of separate runs of endless flexible strands, for example wire cables or metal straps, which extend the length of the machine and are arranged in spaced apart courses across the width of the machine and retained in tension between grooved drive rollers and a plurality of spaced apart tension pulleys also disposed in spaced apart relationship at alternative ends of the machine. In order to transfer the web from one course of strands to the next, curved or arcuate guide plates are provided so that as the pulp sheet hits the end of each run or course it passes between the guide plate and the strands and is deflected around into contact with the next lower run and so on. Each course of the spaced apart strands is separate with respect to support and tension and all courses are driven at substantially the same speed so that the juxtaposed lower run of one course is proceeding in the same direction and at the same speed as the upper run of the next course and so on. This means that the pulp sheet after passing into the machine along the top of the first course is deflected in between the lower run of the first course and the top run of the second course to the opposite end of the machine from which it is diverted again back in the opposite direction between the lower run in the opposite course and the upper run in the third course and so on.

In the preferred construction, means in the form of electrically controlled guiding rolls, are provided to guide the leading end of the pulp sheet in its transfer around the arcuate deflecting plates. The guiding rolls are mounted so as to be selectively placed in or removed from guiding position relative to the ends of the runs of the strands and the arcuate plates. The movement of the guiding rolls is controlled by switch operating feelers placed in the path of the pulp sheet as it proceeds. These feelers also operate to reactuate the guide rolls in the case of a break in the pulp sheet.

In effect, in the present arrangement the sheet passes along between two sets of strands going in the same direction after passing the first course so that any deflection of the material away from the conveying cables, as might occur if a change in tension or shrinkage of the sheet were to occur, is prevented.

Having thus generally described the nature of the invention, particular reference will be made to the accompanying drawings wherein there is shown diagrammatically by way of illustration a conveyor arrangement for a pulp dryer in accordance with the invention; and in which:

Figure 1 is a diagrammatic view in top plan of a preferred construction of a pulp conveying apparatus according to the invention.

Figure 2b is a side view of the other end of the apparatus shown in Figure 1.

Figure 4 is a sectional view of the structure shown in Figure 2b along the line 4—4.

Figure 5a is a longitudinal sectional view of the portion of the apparatus shown in Figure 2a to illustrate the construction in more detail.

Figure 5b is a longitudinal sectional view of the portion of the apparatus shown in Figure 2b to illustrate the construction in more detail.

Figure 6 is a view in plan of a unit of the take-up arrangement on the first cable run.

Figure 7 is a sectional view of the construction shown in Figure 6 along the line 7—7.

Figure 8 is an enlarged diagrammatic view of an alternative roller groove and pulley arrangement for a flat metal band or strap.

Figure 9 is a fragmentary view of Figure 8 along the line 9—9.

Figure 10 is a sectional view of the cable supporting pulleys shown in Figure 8.

Figure 11 is an enlarged plan view, partially in section, of a typical take-up pulley arrangement.

Figure 12 is a sectional view of Figure 11 along the line 12—12.

Figure 13 is a diagrammatic view of a typical arrangement of an auxiliary guiding roller and the associated controlling mechanism.

Figure 2A:
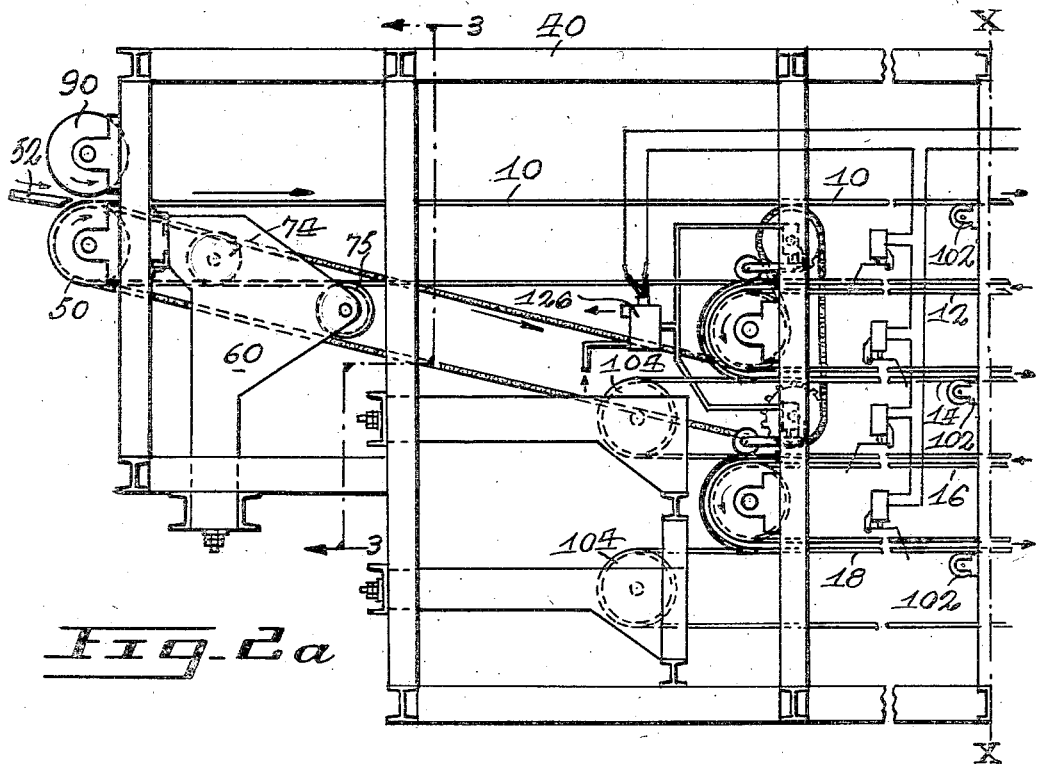
Figure 2a is a side view of one end of the apparatus shown in Figure 1.
Figure 3:
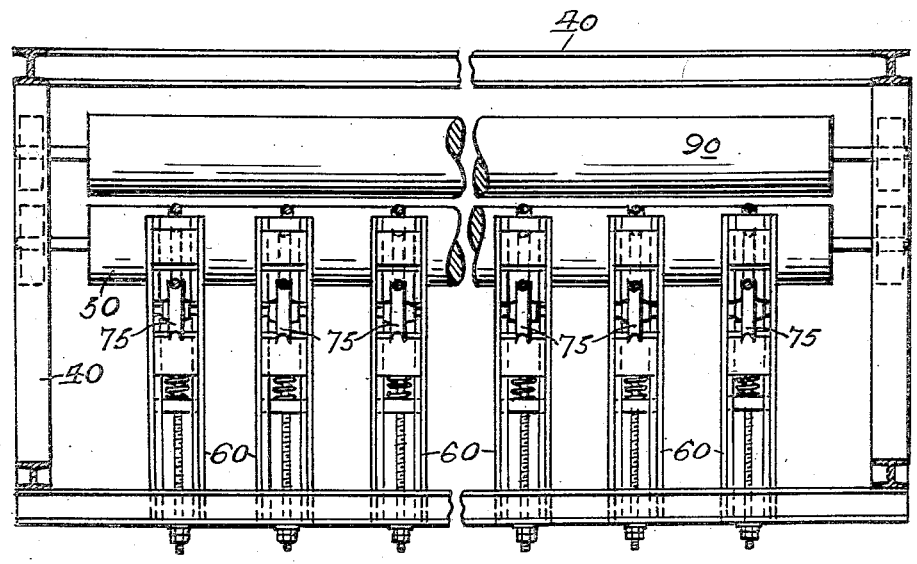
Figure 3 is a sectional view of the structure shown in Figure 2a along the line 3—3.

With particular reference to the drawings, a pulp conveying arrangement in accordance with the invention is shown as it would appear when positioned within a drying enclosure embodying means for the controlled drying of the sheet as it proceeds.

In the arrangement illustrated, a plurality of courses of endless cables 10, 12, 14, 16, and 18 are shown as being mounted in superimposed relationship on a frame 40 within a drying enclosure (not illustrated).

Each cable course comprises a plurality of laterally spaced apart endless cables 30 which are guided and retained in position between opposing sets of separate tensioned pulleys and non-tensioned grooved supporting rollers.

With the exception of the first course 10 and the last course 18 the arrangement is identical throughout the complete run of the conveyor. It will be appreciated that while only three courses 12, 14, 16 are shown between the first run 10 and the last run 18, this is for the purpose of illustration only and in actual practice the number of courses will depend on the desired requirements and dimensions of the pulp dryer. The framework 40 shown as supporting the present conveyor arrangement is also illustrative only and this may be varied as required to suit the dimensions and construction of varying drying enclosures.

In the construction illustrated the first or lead in run 10 is supported and guided by a driven grooved roller 50 at the entry end 52, regularly spaced apart idler rollers 102 along the length of the dryer and a further grooved idler roller 56 at the other end 53 of the dryer. Resilient tension is maintained on the cables 30 making up the first run 10 by take-up assemblies 60 which are mounted on brackets 62 secured to the framework 40 in alignment with each cable. As shown most clearly in Figures 5a, 6, and 7, each take-up arrangement assembly 60 includes a guiding channel 70 forming part of the bracket 62. A take-up slide 72 is mounted in the guiding channel 70 and a pulley 74 is mounted on each take-up slide 72. Each take-up slide 72 is resiliently biased by a coil spring 76 mounted over an adjustable take-up rod 78 so that it acts between a fixed stop 80 positioned within the guiding channel 70 and a bracket 82 secured to the take-up slide 72. The bracket 62 includes an extension 63 on which there is mounted a further grooved pulley 75.

With this arrangement, when mounted in spaced apart relationship across the width of the conveyor frame in alignment with each endless cable 30, adjustable resilient tension is maintained on each cable over the entire run.

A top roller 90 is also mounted for free rotation on the frame 40 above and in axial alignment with the grooved driving roller 50 at the entry end 52.

As previously mentioned, the succeeding courses 12, 14 and 16 are identical with each other. Each course is supported, driven and guided by a first driven grooved roller 100, spaced apart idler rollers 102, and a plurality of spaced apart resiliently biased take-up pulleys 104. Each take-up pulley arrangement consists of a take-up pulley 104 mounted in a take-up slide 106 which in turn is slidably mounted in a guide channel 108 secured to the framework 40. Each take-up slide 106 is resiliently biased by a coil spring 110 mounted over an adjustable take-up rod 112 extending between a fixed member 114 secured to the guide channel 108 and a bracket 115 secured to each slide 106.

The fixed drive rollers 100 and the resiliently biased take-up pulleys 104 are disposed at alternate ends of the framework 40 so as to maintain the desired resilient tension to the individual cables 30 making up the courses 12, 14, 16.

The bottom or discharge course 18 differs slightly from the standard courses in that the non-tensioned driver roller 101 is positioned on the exterior of the framework 40 to take the dried pulp web out of the drying enclosure. A plain top roller 103 is positioned above and in axial alignment with the roller 101. A take-up pulley arrangement 104 similar to the arrangements previously described maintains the desired resilient tension.

It will be appreciated that while the take-up pulley arrangements shown are resiliently biased by coil springs, other tensioning arrangements might be utilized. For example, fluid cylinder and piston arrangements could be utilized for this purpose.

In order to transfer the layer of pulp from one course or run to the next, curved or arcuate guide plates 110 are provided as partially surrounding each non-tensioned roller 100 so that as the pulp layer or sheet hits the end of each course, it is deflected between the guide plates 110 into contact with the next lower course and so on. It should be noted that the supporting run of each course passes through the lower portion of each guide plate 110 so that in effect the pulp layer passes along between two sets of cables 30 going in the same direction after the first course.

To ensure that the leading end of the pulp sheet feeds between the first guide plate 110 and the succeeding guiding plates, supplementary guide rollers 120 are provided at alternative ends of the cable courses adjacent each guide plate 110. The supplementary guide rollers are each mounted on a pivotally mounted lever arm 122 extending from the framework 40 so that each roller is adapted to be moved towards and away from the corresponding cable run. The movement of each of the lever arms 122 is accomplished by suitable mechanical means for example, by a pneumatic cylinder 123 and piston arrangement 124 as illustrated. The piston 124 of each unit is pivotally connected to the corresponding lever arm and the air supplied to the cylinder 123 is controlled by master solenoid valves 126, 127 through the action of feeler operated micro switches 128 positioned in the path of the travelling pulp sheet. A typical illustration of this arrangement is shown diagrammatically in Figure 13.

The feelers 130 of the micro switches 128 are normally positioned between the cables 30 of each run and are contacted by the leading edge of the pulp web as it proceeds. The action of the first switch 128, through the first feeler 130 actuates the solenoid valve 127 to bring the first roller 120 down into guiding position relative to the first cable run 10 ensuring that the leading end of the pulp web is fed around the arcuate plate 110 to the next course 12. The contact of the web with the second switch feeler 130 operates the valve 127 to raise the first roller 120 from guiding position since the web has passed around the first guide plate 110 and is now proceeding along the course 12 to the opposite end of the conveyor. Contact of the web with the third feeler 130 operates the solenoid valve 126 dropping the guide roller 120 on that end and so on throughout the entire travel of the conveyor.

As will be appreciated, once the leading end of the web has passed around all the guide plates 110 and over all courses the guide rollers, through the action of the feelers 130, will remain inactive avoiding unnecessary friction drag. If a break in the web occurs the feelers 130, in the vicinity of the break, will again operate the valves 126, 127 to bring the necessary guiding rollers 120 into operation to lead the broken end into the corresponding guide plate 110. It is contemplated that the visual or audible signal means might be connected with the controlling system shown so that the operator would be immediately warned if a break occurs.

As is shown diagrammatically in Figures 2a and 5b the switches 128a on one end of the conveyor control the action of the solenoid valve 126 and the switches 128b on the other end of the conveyor control the solenoid valve 127, each set being connected in series.

Since the weight of the pulp layer, which is usually in the order of from about ¼" to ½" in thickness is considerable over the length of the cable courses, approximately from about 100 to about 125 feet in length, it is essential to have sufficient idler rollers 102 disposed in spaced apart relationship beneath the upper run of each course. Accordingly, while the sections 2a, 2b only show two sets of such rollers it will be understood that these are portional views only and that similar rollers will be provided along the length of the apparatus.

The necessary power drive, not shown, can be of any known construction. For example, as shown partially in Figure 2a, the grooved drive rolls 50, 100 can be driven through a suitable gear train and associated drive chain arrangement. On one end of the conveyor the drive rollers will be driven in one direction and on the other side in the opposite direction. All the cables 30 will be driven at approximately the same speed to avoid friction between the cables and the pulp sheet or web.

As an alternative construction the cables 30 shown can be replaced by flat bands or straps of flexible metal 140. The only necessary change to the construction shown would be the provision of different shaped grooves in the guiding and supporting pulleys and rollers. These would be altered as shown in Figures 8, 9 and 10 so as to present a slightly cambered flat surface 142 covered or coated with a resilient material, as indicated at 144 to prevent slippage. The cambering of the pulley and roller grooves maintains the central tracking of the flat bands.

I claim:

1. A conveyor system for conveying a layer of pulp stock along a circuitous path through a pulp drying enclosure, comprising a supporting frame, a plurality of juxtaposed courses of aligned laterally spaced apart endless strands extending the length of said enclosure, each of said courses extending between a non-tensioned roller and a plurality of resiliently tensioned pulleys mounted on opposite ends of said supporting frame, said non-tensioned rollers and tensioned pulleys being mounted in said frame at alternative ends of said enclosure at each successive course, an arcuate guide plate of substantially equal length to said non-tensioned rollers mounted on said frame adjacent one end of each of said courses so as to at least partially surround the non-tensioned roller guiding said course in spaced apart relationship therewith and adapted to deflect said pulp layer from one course to the next succeeding course, means to drive said non-tensioned strand guiding rollers disposed adjacent one end of said frame in one direction and said non-tensioned rollers disposed adjacent the other end of said frame in the opposite direction, and supplementary pulp layer guiding means mounted adjacent each of said arcuate guide plates and adapted to guide the leading end of said pulp layer into successive deflecting contact with said arcuate guide plates as it proceeds from course to course, actuating means connected to said supplementary pulp layer guiding means adapted to move said strand guiding means towards and away from the corresponding strand courses and control means connected to said actuating means and including a contact member disposed in the path of each of said strand courses.

2. A conveyor system as claimed in claim 1, wherein said endless strands comprise endless flexible metal cables.

3. A conveyor system as claimed in claim 1, wherein said endless strands comprise endless flexible metal straps.

4. A conveyor system as claimed in claim 1, wherein a plurality of spaced apart grooved idler rollers are mounted in said frame so as to support the top run of each of said endless courses.

5. A conveyor system for conveying a layer of pulp stock along a circuitous path through a pulp drying enclosure, comprising a supporting frame, a plurality of juxtaposed courses of aligned laterally spaced apart endless flexible strands extending the length of said enclosure, each of said courses extending between a non-tensioned roller and a plurality of resiliently tensioned pulleys mounted on opposite ends of said supporting frame, said non-tensioned rollers and tensioned pulleys being mounted in said frame at alternative ends of said enclosure at each successive course, an arcuate guide plate of substantially equal length to said non-tensioned rollers mounted on said frame adjacent one end of each of said courses so as to at least partially surround the non-tensioned roller guiding said course and in spaced apart relationship therewith and adapted to deflect said pulp layer from one course to the next succeeding course, means to drive said non-tensioned strand guiding rollers disposed adjacent one end of said frame in one direction and said non-tensioned rollers disposed adjacent the other end of said frame in the opposite direction, and a supplementary pulp guiding member pivotally mounted on said frame above each of said non-tensioned guiding rollers adapted to guide the leading end of said pulp layer into successive deflecting contact with said arcuate guide plates as it proceeds from course to course, actuating means adapted to move said supplementary pulp guiding members towards and away from said corresponding strand courses, and control means connected to said actuating means including a contact member disposed in the path of each of said strand courses.

6. A conveyor system, as claimed in claim 5, wherein said endless strands comprise endless flexible metal cables.

7. A conveyor system, as claimed in claim 5, wherein said endless strands comprise endless flexible metal straps.

8. A conveyor system, as claimed in claim 5, wherein a plurality of spaced apart grooved idler rollers are mounted in said frame so as to support the top run of each of said endless courses.

9. A conveyor system for conveying a layer of pulp stock along a circuitous path through a pulp drying enclosure, comprising a supporting frame, a plurality of juxtaposed courses of aligned laterally spaced apart endless flexible strands extending the length of said enclosure, each of said courses extending between a non-tensioned strand guiding member and a plurality of resiliently tensioned spaced strand guiding members mounted on opposite ends of said supporting frame, said non-tensioned members and tensioned members being mounted in said frame at alternative ends of said enclosure at each successive course, an arcuate guide plate of substantially equal length to said non-tensioned members mounted on said frame adjacent one end of each of said courses so as to at least partially surround the non-tensioned member guiding said course in spaced relationship therewith and adapted to deflect said pulp layer from one course to the next succeeding course, means to drive said non-tensioned strand guiding members disposed adjacent one end of said frame in one direction and said non-tensioned strand guiding members disposed adjacent the other end of said frame in the opposite direction, and supplementary pulp guiding members pivotally mounted on said frame above and in register with each of said non-tensioned guiding members, one adjacent each of said arcuate pulp guide plates, fluid pressure means adapted to move said supplementary pulp guiding members towards and away from the corresponding strand courses, and control means connected to said fluid pressure means including a switch lever disposed in the path of each of said strand courses.

10. A conveyor system, as claimed in claim 9, wherein said endless strands comprise endless flexible metal cables.

11. A conveyor system, as claimed in claim 9, wherein said endless strands comprise endless flexible metal straps.

12. A conveyor system, as claimed in claim 9, wherein a plurality of spaced apart grooved idler rollers are mounted in said frame so as to support the top run of each of said endless courses.

References Cited in the file of this patent

UNITED STATES PATENTS

| | | |
|---|---|---|
| 1,585,275 | Albrecht | May 18, 1926 |
| 1,658,684 | Kocha | Feb. 7, 1928 |
| 1,998,912 | Troy | Apr. 23, 1935 |
| 2,006,091 | Walter | June 25, 1935 |
| 2,510,185 | Malott | June 6, 1950 |